March 14, 1961 F. W. SUHR 2,975,311
SHADED POLE MOTOR
Filed May 28, 1958 2 Sheets-Sheet 1
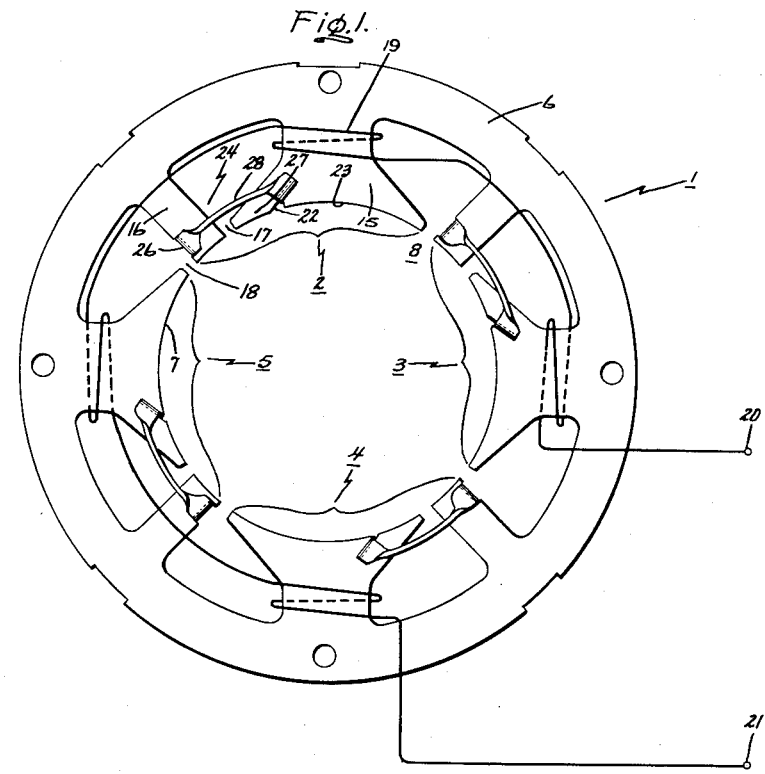
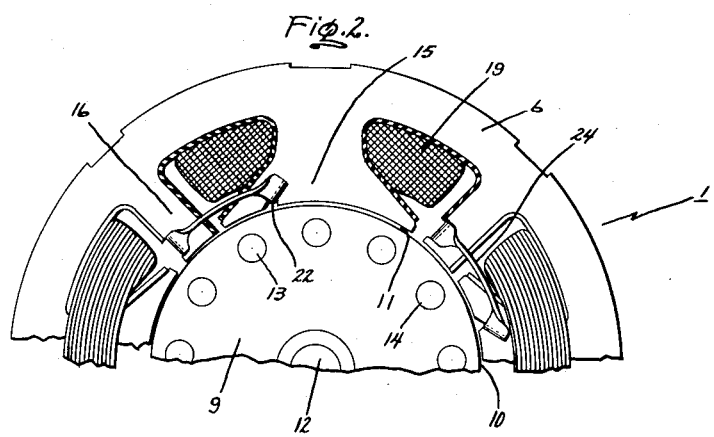
Inventor:
Fred W. Suhr,
by H. F. Manbeck, Jr.
Attorney.

March 14, 1961   F. W. SUHR   2,975,311
SHADED POLE MOTOR
Filed May 28, 1958   2 Sheets-Sheet 2
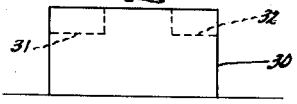
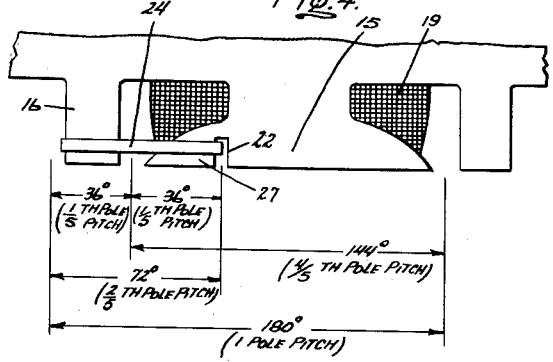
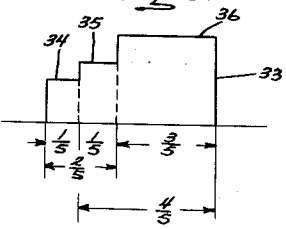
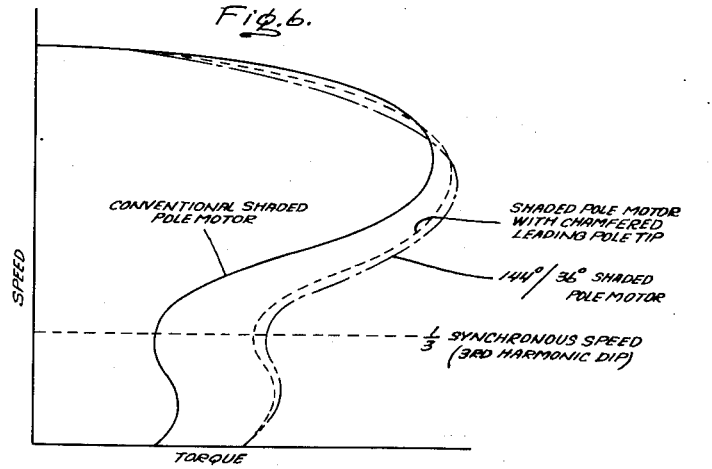
Inventor:
Fred W. Suhr,
by H. F. Manbeck, Jr.
Attorney.

United States Patent Office 2,975,311
Patented Mar. 14, 1961

2,975,311

SHADED POLE MOTOR

Fred W. Suhr, Fort Wayne, Ind., assignor to General Electric Company, a corporation of New York Filed May 28, 1958, Ser. No. 738,386

7 Claims. (Cl. 310—172)

This invention relates to single phase alternating current shaded pole induction motors, and more particularly to the stator core members of such motors.

Most common varieties of electric motors fundamentally embody the same principal of operation, i.e., the positioning of a current carrying conductor in a magnetic field; the flow of current in the conductor produces magnetic lines of force concentric therewith which react with the magnetic lines of force of the field to produce a physical force tending to move the conductor out of the field. A classic variety of electric motor for operation from a source of alternating current is the induction motor in which one of the core members, generally the rotor, is provided with a short-circuited winding and the other core member is provided with a field exciting winding. Here, energization of the field winding from a source of alternating current induces a heavy current flow in the short circuited winding by transformer action, this heavy current flow cooperating with the magnetic flux produced by the field winding to provide the rotational effect. Mere energization of the field winding with single phase alternating current will not, however, start an induction motor since the alternating magnetic field and the resultant induced alternating current in the short circuited winding produce alternating equal and opposite rotational forces; once started however, an induction motor will operate from a source of single phase alternating current. A rotating magnetic field must therefore be provided in order to start an induction motor. This rotating magnetic field is readily provided by a source of polyphase alternating current, however, in the case of a motor to be operated from single phase alternating current, means must be provided to produce a rotating magnetic field, at least during the starting interval.

The shaded pole motor is a well known type of single phase induction motor. Here, a portion of each pole of the field core member has a short circuited coil, referred to as a shading coil, arranged thereon in addition to the main field winding which customarily embraces the entire pole. In this construction, the magnetic flux produced by the main field winding links the shading coil and by transformer action induces a heavy current therein, this heavy current in turn providing a component of flux, which by virtue of the inductance of the shading coil, lags the flux produced by the main field winding by 90 electrical degrees. It is thus seen that two time spaced components of field flux are provided in a shaded pole motor, thus providing the rotating magnetic field necessary for starting.

Shaded pole induction motors have generally been characterized by their relatively low starting torque since the lagging or quadrature component of M.M.F. provided by the shaded portion of each pole generally forms only a small part of the total M.M.F., and further have generally been characterized by relatively low efficiency, as compared with other types of induction motors. These characteristics have therefore generally limited shaded pole motors to the fractional horsepower frame sizes and to low starting torque applications, such as air moving. In addition, shaded pole induction motors, in common with other types of alternating current motors, generally suffer from a phenomenon referred to as the "third harmonic dip." This phenomenon is evidenced by a reduction in the torque output of the motor at about 38% of the synchronous speed thereof, in some instances this torque reduction or dip being so marked that the motor is unable to reach full speed and hangs up at approximately ⅓ of full speed. The so-called dip torque of shaded pole motors has been improved in some instances by such expedients as providing an increased air gap adjacent the leading tip of each pole, i.e., the side of the pole remote from the shaded pole portion. The improvement in dip torque provided by these arrangements has, however, generally been at the expense of some efficiency.

The so-called third harmonic dip results from the fact that in a conventional shaded pole motor, the space distribution of the M.M.F. in the air gap between each pole face and the rotor is essentially rectangular. It is well known that a rectangular wave, as opposed to a sinusoidal wave, is represented by a very complex mathematic formula being made up of numerous harmonics, with the third harmonic having a magnitude of ⅓ of the fundamental, and with the fifth and seventh harmonics likewise having appreciable magnitudes. The third harmonic dip in the torque output encountered in shaded pole motors is attributable to the third harmonic of the M.M.F. wave under each pole and thus it would be thought that complete elimination of this third harmonic would in turn eliminate its deleterious effects on the speed-torque characteristic of the motor. However, interestingly, at speeds below ⅓ of the synchronous speed, the torque attributable to the third harmonic augments the torque attributable to the fundamental while at speeds about ⅓ of synchronous, the third harmonic detracts from the fundamental. Thus, it has been found that complete elimination of the third harmonic of the space M.M.F. under each pole produces such a drastic reduction in starting torque that the motor may not start. It is thus necessary to effect a compromise, i.e., to cause sufficient reduction in the magnitude of the third harmonic to provide the desired reduction in the dip torque of the motor while still retaining a sufficient amount of third harmonic so that the starting torque is not adversely affected. The fifth harmonic has an effect similar to the third harmonic, i.e., it augments the starting torque at speeds less than ⅕ of synchronous speed and detracts from the torque at speeds above ⅕ of synchronous speed. Here, however, since the fifth harmonic has a magnitude substantially less than the third, it is desirable completely to effect its elimination, and it is likewise desirable completely to eliminate the seventh harmonic of the space M.M.F. It is therefore desirable to provide a shaded pole induction motor construction in which a substantial part but not all of the third harmonic and all of the fifth harmonic of the space M.M.F. is eliminated without the adverse effect on efficiency and power factor encountered in previous shaded pole motor constructions known to the present applicant in which provision was made for decreasing the harmonics in the space M.M.F.

It is therefore an object of this invention to provide an improved shaded pole induction motor.

Another object of this invention is to provide a shaded pole induction motor in which the dip torque is improved.

A further object of this invention is to provide a shaded pole induction motor in which a substantial part of the third harmonic and all of the fifth harmonic of the space M.M.F. is eliminated, with the efficiency and power factor of the motor being higher than prior shaded pole motors known to the present applicant.

Further objects and advantages of this invention will become apparent by reference to the following description and the accompanying drawings, and the features of novelty which characterize this invention will be pointed out with particularity in the claims annexed to and forming a part of this specification.

This invention in its broader aspects provides a stator core member for a shaded pole motor having at least one pair of pole portions respectively having pole faces defining a bore for receiving a rotor member, each of the pole portions having a main pole section and an auxiliary pole section. In accordance with my invention, each of the auxiliary pole sections has a pole face span substantially smaller than the pole face span of its associated main pole section and each of the pole portions has a shading coil embracing all of its auxiliary pole section and less than one-half of its main pole section. Main field winding coils are arranged on the main pole sections only. In the preferred embodiment of my invention, each pole portion has a pole face span of 180 electrical degrees with each auxiliary pole section having a pole face span of approximately 36 electrical degrees and each of the main pole sections having a pole face span of approximately 144 electrical degrees, the shading coil having a span of approximately 72 electrical degrees. It is thus seen that the auxiliary pole sections respectively intermediate adjacent main pole sections have a span of one-fifth of the pole pitch, i.e., one-fourth of the main pole span, the main pole sections have a span of four-fifths of the pole pitch, and the shading coils having a span of two-fifths of the pole pitch, i.e., one-half the main pole span. In this manner, the third harmonic of the space M.M.F. under each pole portion is substantially reduced and the fifth harmonic is substantially eliminated. Since the air gap is uniform under each pole portion, the efficiency of the motor is improved over that provided by the stepped and chamfered pole tips of prior shaded pole motors known to the applicant and the provision of the auxiliary pole sections between the main pole sections reduces the mutual coupling between adjacent field windings and thus reduces the over-all inductive reactance of the motor with a corresponding improvement in its power factor.

In the drawings,

Fig. 1 is a side-elevational view of a stator core member for a four-pole shaded pole motor incorporating my invention;

Fig. 2 is a fragmentary view, partly in cross-section, further illustrating my invention;

Fig. 3 is a schematic illustration of the space M.M.F. wave of a conventional shaded pole motor useful in explaining my invention;

Fig. 4 is a fragmentary schematic view of one pole portion of the improved shaded pole motor construction of my invention showing the relative pole face spans of the auxiliary and main pole sections and the shading coil;

Fig. 5 is another schematic diagram showing the space M.M.F. waveform provided by my improved stator core member construction; and Fig. 6 is a chart showing the speed-torque characteristics of a conventional shaded pole motor, a shaded pole motor having a chamfered pole tip construction, and the improved shaded pole motor construction of my invention.

Referring now to Figs. 1, 2 and 4 of the drawings, there is shown a stator core member 1 conventionally formed of a stacked plurality of laminations punched from relatively thin sheet magnetic material. The stator core member 1 is shown as being of the four-pole variety and thus including four salient pole portions 2, 3, 4 and 5 extending radially inward from yoke portion 6. Pole portions 2, 3, 4 and 5 have their pole faces 7 arranged to define bore 8 in which rotor member 9 is concentrically arranged, as particularly shown in Fig. 2. The outer periphery 10 of rotor member 9 defines uniform concentric air gaps 11 with the pole portions 2, 3, 4 and 5 and is also conventionally formed of a stacked plurality of laminations punched from relatively thin sheet magnetic material which are mounted on shaft 12. Rotor 9 is shown as having a squirrel cage winding formed of conductors 13 disposed therein, the conductors 13 being connected at each end of the rotor by short circuiting end rings (not shown). The squirrel cage winding comprising the conductors 13 and the short circuiting end rings is conventionally formed of aluminum by die casting although individual copper bars connected together with copper end rings brazed thereto may equally advantageously be employed with my invention. The rotor 9 is further shown as being of the closed slot variety, i.e., with the openings 14 in which the squirrel cage conductors 13 are arranged not communicating with the exterior periphery of the rotor. While a closed slot rotor construction is particularly desirable by virtue of the elimination of slot noise, it will be understood that an open slot rotor construction may also be equally advantageously utilized with my improved stator construction.

Each of the pole portions 2, 3, 4 and 5 includes a main pole section 15 and an auxiliary pole section 16; it will be seen that the auxiliary pole sections 16 are spaced between the adjacent main pole sections 15 respectively forming circumferential air gaps 17 and 18 with the trailing and leading pole tips of the adjacent main pole sections 15. Circumferential air gaps 17 and 18 between the auxiliary pole sections 16 and the adjacent main pole sections 15 are preferably no more than 10 percent of the pole pitch but must nevertheless be sufficiently large to permit winding the field exciting windings onto the main pole sections 15 with automatic winding machinery; it will be readily understood that the magnet wire employed to wind the main and field exciting windings on the main pole sections 15 must pass from the bore 8 through the circumferential air gaps 17 and 18. Each of the main pole sections 15 is provided with a main field exciting winding 19, the field exciting windings 19 on the main pole sections 15 of pole portions 2, 3, 4, and 5 being serially connected across input terminals 20 and 21 as shown. Input terminals 21 in turn are adapted to be connected to a suitable source of single phase alternating current, such as 120 volt 60 cycles. Each main pole section 15 is provided with a slot 22 extending inwardly from its pole face 23 and shading coils 24 are provided each having one side 25 positioned in a respective slot 22 and its other side 26 engaging the side of auxiliary pole sections 16 remote from its associated main pole 15. It is thus seen that each shading coil 24 embraces all of its respective auxiliary pole section 16 and a portion 27 of its respective main pole portion 15. Shading coils 24 are preferably formed of flat copper bar stock with their sides 28 being twisted intermediate ends 25 and 26 as shown. It will be readily understood that field windings 19 may be connected in parallel, or in any series-parallel combination as is well known in the art.

Referring now particularly to Fig. 4, it will be seen that each of the pole portions 2, 3, 4 and 5 has a pole face span of 180 electrical degrees, referred to as one pole pitch. In accordance with my invention, the auxiliary pole sections 16 have a pole face span of 36 electrical degrees, i.e., one-fifth pole pitch and the main pole sections 15 have a pole face span of 144 electrical degrees, i.e., four-fifths pole pitch. It will thus be seen that the main field exciting windings 19 have a span of 144 electrical degrees (four-fifths pole pitch). The shading coil 24 has a span of 72 electrical degrees (two-fifths pole pitch) and it will thus be seen that the span of the shaded portion 27 of the main pole section 15 is 36 electrical degrees (one-fifth pole pitch) thus being equal to the span of the auxiliary pole section 15.

Referring now to Fig. 3, there is shown at 30 an idealized waveshape of the instantaneous space M.M.F. in the air gap under a pole of a conventional shaded pole motor, i.e., without stepped or chamfered portions formed in the pole faces; it will be understood that due to fringing effects and leakage, the actual waveform of the instantaneous space M.M.F. will not conform exactly to the essentially rectangular configuration shown in Fig. 3. It will be recognized that the essentially rectangular waveform 30 shown in Fig. 3 is far from a sinusoidal waveform and that by virtue of its rectangular configuration, it will be composed of many harmonics including substantially third, fifth and seventh harmonics. Actually, the provision of the conventional shading coil has provided some reduction in the instantaneous M.M.F. at the trailing edge of the pole tip, as shown by the dashed line 31 which has to some extent reduced the deleterious effect of the third harmonic. In an effort further to reduce the third harmonic and to make the space M.M.F. waveform 30 more closely approximate a sine wave, the stepped or chamfered air gap configurations of the prior art have been provided at the leading edge of the pole, thus further modifying the waveshape of the space M.M.F. as shown by the dashed lines 32. As indicated previously, however, the increased air gap provided by the stepped or chamfered pole tip arrangements of the prior art has decreased the overall efficiency of the motor.

Turning now to Fig. 5, it will be seen that the waveform 33 of the space M.M.F. of my improved stator construction is divided into three sections 34, 35 and 36, sections 34 and 35 being respectively one-fifth of the pole pitch or collectively two-fifths, with sections 35 and 36 collectively being four-fifths of the pole pitch. It is well known that reduction of a rectangular waveform of 120° of its total 180° half-cycle span will completely eliminate the third harmonic. However, as previously indicated, I have found that the presence of some third harmonic in the waveform of the space M.M.F. is in fact desirable in order to insure adequate starting torque. Thus, in accordance with my invention, I have reduced the span of the main winding 19 to less than a full pole pitch, i.e., to four-fifths or 144° which is substantially less than a full pole pitch of 180° and yet sufficiently greater than 120° to provide sufficient third harmonic for starting. Furthermore, the two-fifths-four-fifths relationship of the shaded coil span to the field winding span provides complete elimination of the fifth harmonic of the space M.M.F. and it is well known in the art that the seventh harmonic can be eliminated by a suitable skew of the squirrel cage conductors of the rotor.

A four-pole shaded pole motor for operation from 115 volts 60 cycles, single phase alternating current, has been constructed in accordance with my invention in the so-called twenty-nine frame size. The stator 1 of this motor was formed of a one and one-half inch stack of common iron laminations having a thickness of approximately .025 inch and a twenty-eight bar low resistance rotor having a skew of 51.5 electrical degrees was utilized. This motor had a four-fifths main field winding pitch (144 electrical degrees) and a two-fifths shading coil pitch (72 electrical degrees), as shown in Fig. 4. When tested, this motor provided a breakdown torque of 11.45 ounce feet at 1430 r.p.m. with a full load efficiency (70% of breakdown torque) of 42.1%, a full load output of 116.7 watts, a full load speed of 1639 r.p.m., a full load power factor of 60%, a full load torque of 8.01 ounce feet, and a full load current of 3.76 amps. This motor had a dip torque of 3.55 ounce feet and thus a ratio of dip torque to breakdown torque of .310 and a slip torque of 1.83 ounce feet with a slip torque to break torque ratio of .160. Inspection of the curves of Fig. 6 will indicate that the speed-torque characteristic of my motor construction is quite comparable to that provided by a typical shaded pole motor of the same frame size and rating having a chamfered leading pole tip. However, with my improved shaded pole motor construction, the efficiency is over 42% as opposed to efficiencies on the order of 38% with the chamfered pole tip construction, and it will further be understood that the power factor is on the order of 60% as opposed to 55% with the chamfered construction. While the above described motor bore a nominal rating of ⅛ horsepower, it will be readily apparent that its actual output justifies a rating of ⅙ horsepower.

While my improved shaded pole motor stator core construction has been shown as embodied in a four-pole motor, my invention is not limited to four-pole constructions and the principles thereof are equally applicable to a two-pole construction or motors having more than four poles. Likewise, some deviation from the relationship shown in Figs. 4 and 5 is permissible within the scope of my invention, however, I have found that the shading coil must embrace appreciably less than one-half of the main pole section and preferably about one-quarter in order to obtain optimum advantage of my invention.

It will now be seen that I have provided an improved shaded pole motor construction in which the third harmonic of the space M.M.F. is substantially reduced thereby reducing the deleterious third harmonic dip without adversely affecting the starting torque. It will further be seen that the fifth harmonic of the space M.M.F. has been completely eliminated, this substantial reduction of the third harmonic and elimination of the fifth harmonic being accomplished with increased efficiency and power factor over that provided by prior shaded pole motor constructions known to the present applicant.

While I have illustrated and described a specific embodiment of my invention, further modifications and improvements will occur to those skilled in the art and I desire therefore in the appended claims to cover all modifications which do not depart from the spirit and scope of my invention.

What I claim as new and desire to secure by Letters Patent of the United States is:

1. In a single phase alternating current shaded pole induction motor: a stator core member comprising at least one pair of pole portions respectively having pole faces defining a bore for receiving a rotor member, each of said pole portions having a main pole section and an auxiliary pole section, each of said auxiliary pole sections having a pole face span substantially smaller than the pole face span of its associated main pole section, each of said pole portions having a shading coil embracing its auxiliary pole section and less than one-half of its main pole section and a main field winding coil arranged on its main pole section so that the third harmonic of the space M.M.F. under each pole portion is substantially reduced and the fifth harmonic is substantially eliminated.

2. In a single phase alternating current shaded pole induction motor: a stator core member comprising at least one pair of pole portions respectively having pole faces defining a bore for receiving a rotor member, each of said pole portions having a main pole section and an auxiliary pole section, each auxiliary pole section having a pole face span of approximately one-fifth of the pole pitch of its pole portion, each of said pole portions having a shading coil embracing the respective auxiliary pole section and less than one-half of the respective main pole section; and field windings respectively arranged on said main pole sections.

3. In a single phase alternating current shaded pole induction motor: a stator core member comprising at least one pair of pole portions respectively having pole faces defining a bore for receiving a rotor member, each of said pole portions having a main pole section and an auxiliary pole section, each main pole section having a pole face span of approximately four-fifths of the pole pitch of its pole portion, each of said pole portions having a shading coil embracing the respective auxiliary pole section and less than one half of the respective main pole section; and field windings respectively arranged on said main pole sections.

4. In a single phase alternating current shaded pole induction motor: a stator core member comprising at least one pair of pole portions respectively having pole faces defining a bore for receiving a rotor member, each of said pole portions having a main pole section and an auxiliary pole section, each auxiliary pole section having a pole face span of approximately one-fifth and each main pole section having a pole face span of approximately four-fifths of the pole pitch of the said pole portions, each of said pole portions having a shading coil embracing the respective auxiliary pole section and less than one half of the respective main pole sections; and field windings respectively arranged on said main pole sections.

5. In a single phase alternating current shaded pole induction motor: a stator core member comprising at least one pair of pole portions respectively having pole faces defining a bore for receiving a rotor member, each of said pole portions having a main pole section and an auxiliary pole section, each auxiliary pole section having a pole face span of approximately one-fifth and each main pole section having a pole face span of approximately four-fifths of the pole pitch of said pole portions, each of said pole portions having a shading coil embracing the respective auxiliary pole section and approximately one-quarter of the respective main pole section; and field windings respectively arranged on said main pole sections.

6. In a single phase alternating current shaded pole induction motor: a stator core member comprising at least one pair of pole portions respectively having pole faces defining a bore for receiving a rotor member, each of said pole portions having a pole face span of 180 electrical degrees, each of said auxiliary pole sections having a pole face span of approximately 36 electrical degrees and each of said main pole sections having a pole face span of approximately 144 electrical degrees, each of said pole portions having a shading coil embracing all of the respective auxiliary pole section and a part of the respective main pole section with a span of approximately 72 electrical degrees; and field windings respectively arranged on said main pole sections to the exclusion of said auxiliary pole sections.

7. A single phase alternating current shaded pole induction motor comprising: a stator core member having at least one pair of pole portions respectively having pole faces defining a bore, each of said pole face portions having a pole face span of 180 electrical degrees, each of said auxiliary pole sections having a pole face span of approximately 36 electrical degrees and each of said main pole sections having a pole face span of approximately 144 electrical degrees, each of said pole portions having a shading coil embracing all of the respective auxiliary pole section and a part of the respective main pole section with a span of approximately 72 electrical degrees; field windings respectively arranged on said main pole sections to the exclusion of said auxiliary pole sections; and a closed slot low resistance squirrel cage rotor member concentrically arranged within said stator core member bore.

References Cited in the file of this patent
UNITED STATES PATENTS

| | | |
|---|---|---|
| 2,002,382 | Wilson | May 21, 1935 |
| 2,761,082 | Chang | Aug. 28, 1956 |